United States Patent [19]

Minami et al.

[11] Patent Number: 4,546,030
[45] Date of Patent: Oct. 8, 1985

[54] POLYETHYLENE TEREPHTHALATE FILM, PROCESS FOR THE PRODUCTION THEREOF AND MAGNETIC RECORDING MEDIUM THEREFROM

[75] Inventors: Satoyuki Minami; Kazuhiro Tanaka; Takeshi Nishioka, all of Ohtsu, Japan

[73] Assignee: Toray Industries, Inc., Tokyo, Japan

[21] Appl. No.: 654,599

[22] Filed: Sep. 26, 1984

Related U.S. Application Data

[62] Division of Ser. No. 425,960, Sep. 28, 1982, Pat. No. 4,497,865.

[30] Foreign Application Priority Data

Feb. 17, 1982 [JP] Japan ................................. 57-22593
Mar. 5, 1982 [JP] Japan ................................. 57-33801

[51] Int. Cl.$^4$ ............................. B32B 4/36; G11B 5/68
[52] U.S. Cl. ................................... 428/220; 428/334; 428/335; 428/336; 428/480; 428/910; 428/694; 528/308.1; 528/308.2; 528/502
[58] Field of Search ............... 528/308.2, 308.1, 502; 428/336, 694, 910, 900, 480, 220, 334, 335; 264/210.7, 235.8, 290.2; 360/134–136

[56] References Cited

U.S. PATENT DOCUMENTS

| | | | |
|---|---|---|---|
| 3,967,025 | 6/1976 | Tanabe | 428/900 |
| 4,226,826 | 10/1980 | Motegi | 264/235.8 |
| 4,234,532 | 11/1980 | Motegi | 264/235.8 |
| 4,316,927 | 2/1982 | Kimura | 428/694 |
| 4,318,957 | 3/1982 | Videc | 428/474.4 |
| 4,370,291 | 1/1983 | Kazama | 264/210.7 |

FOREIGN PATENT DOCUMENTS

34206  3/1979  Japan ................................. 528/308.2

Primary Examiner—Ellis P. Robinson
Attorney, Agent, or Firm—Armstrong, Nikaido, Marmelstein & Kubovcik

[57] ABSTRACT

The present invention relates to a polyethylene terephthalate film having the sum of F-5 values in longitudinal and transverse directions of 3500 to 5000 kg/cm$^2$, absolute heat shrinkages in longitudinal and transverse directions at 100° C. of up to 2.5% and amorphous orientation factor of −1.5 to 0.5, a process for the production thereof and a magnetic recording medium containing the film as a base. The polyethylene terephthalate film useful as a magnetic recording medium having super high-tensile-strength in both longitudinal and transverse directions and a low heat shrinkage is provided, while it has been considered that such properties could not be obtained in polyethylene terephthalate film.

8 Claims, No Drawings

POLYETHYLENE TEREPHTHALATE FILM, PROCESS FOR THE PRODUCTION THEREOF AND MAGNETIC RECORDING MEDIUM THEREFROM

This is a division, of application Ser. No. 425,960, filed Sept. 28, 1982, now U.S. Pat. No. 4,497,865.

BACKGROUND OF THE INVENTION (1) Field of the Invention

The present invention relates to a polyethylene terephthalate (hereinafter referred to as PET) film, process for the production thereof and magnetic recording medium containing the same as a base. Particularly, the present invention relates to a PET film having quite high mechanical strengths, both in longitudinal and transverse directions, excellent dimensional stability and low heat shrinkage, process for the stable production thereof and the magnetic recording material such as a magnetic tape containing this film as a base.

(2) Description of the Prior Art

As for PET films having high mechanical strengths, both in longitudinal and transverse directions, and process for the production thereof, there has been known a process wherein a biaxially oriented film is successively restretched biaxially in longitudinal and transverse directions as disclosed in the specification of U.S. Pat. No. 4,226,826. However, this process has defects that the mechanical strength, i.e., F-5 value of the film cannot be increased sufficiently and if the stretching ratio is increased so as to obtain a film having a high F-5 value, the restretchability becomes bad and heat shrinkage is increased. Further, there has been known a process wherein a biaxially oriented film is simultaneously restretched both longitudinally and transversely as shown in the specification of U.S. Pat. No. 4,234,532. However, this process also has defects that if the F-5 value is increased, the restretchability becomes bad to cause troubles such as breakage of the film in the process of the stretching of the film and heat shrinkage is increased. Therefore, when a film obtained by either of these known techniques is used as a base to provide a magnetic recording layer thereon, the base film is distorted or a uniform tone of an audio recording type or picture quality of a video tape cannot be obtained.

It has been impossible in the prior art to obtain a film having both satisfactory mechanical strength and dimensional stability. One of the characteristic feature of the present invention is that the longitudinal stretching which is effected first is carried out under specific conditions to obain a stretched film having specific properties, particularly birefringence and amorphous orientation factor and, accordingly, restretchability in the next transverse stretching and/or restretching step is improved and properties of the film thus obtained are far superior to those of films obtained in the prior art. Thus, the inventors have succeeded in obtaining a film having quite high strengths, and excellent dimensional stability such as low heat shrinkage.

SUMMARY OF THE INVENTION

An object of the present invention is to provide a PET film having high mechanical strengths in both longitudinal and transverse directions and a high dimensional stability. Another object of the present invention is to provide a PET film for the production of a magnetic recording medium having excellent mechanical properties such as a high F-5 value and a low heat shrinkage. Still another object of the present invention is to provide a process for producing a PET film having the above-mentioned excellent properties. A further object of the invention is to provide a magnetic recording medium containing the PET film as a base. Another object of the invention is to provide a magnetic recording tape capable of elongated recording and free of scalloping due to curling. Another object of the invention is to provide a super tensilized PET film having well-balanced strengths in both longitudinal and transverse directions, with high mechanical strengths in both directions and with excellent dimensional stability.

Namely, the present invention relates to:

(1) A super tensilized high-tencity PET film having the sum of F-5 values in both longitudinal and transverse directions of 3500 to 5000 kg/cm$^2$, absolute heat shrinkage in longitudinal and transverse directions of up to 2.5% at 100° C. and an amorphous orientation factor of $-1.5$ to 0.5.

(2) a process for producing an oriented PET film which comprises longitudinally stretching an unoriented PET film in multiple stages to obtain an amorphous orientation factor of up to 0.6 to 1.0 and birefringence of 0.02 to 0.1, then stretching the same transversely 2.5 to 4.5-fold and stretching the same biaxially at a stretching ratio of 1.5 to 2.5 in each direction to attain a total stretching ratio of at least 27, and (3) a magnetic recording film containing this film as a base and a magnetic layer formed thereon.

DESCRIPTION OF THE PREFERRED EMBODIMENTS

PET according to the present invention is ethylene terephthalate homopolymer of polyethylene terephthalate containing up to 20% of a third component. The ethylene terephthalate homopolymer is particularly preferred. The polyethylene terephthalate is synthesized by reacting terephthalic acid or a functional derivative thereof with ethylene glycol or a functional derivative thereof in the presence of a catalyst under proper reaction conditions. One or more third component(s) may be added to the reaction system before or after completion of the polymerization of ethylene terephthalate to obtain a copolymer or mixed polyester.

As the copolymerizable components, there may be used generally compounds containing an ester-forming functional group such as a dicarboxylic acid, e.g., isophthalic acid, naphthalenedicarboxylic acid, 4,4'-biphenyldicarboxylic acid, $\alpha,\beta$-bis(phenoxy)ethane-4,4'-dicarboxylic acid, $\alpha,\beta$-bis(2,6-dichlorophenoxy)ethane-4,4'-dicarboxylic acid and $\alpha,\beta$-bis(2-chlorophenoxy)ethane-4,4'-dicarboxylic acid and dihydroxy compounds, e.g., 1,4-cyclohexanedimethanol and propylene glycol. PET may contain also internal particles or external particles as a lubricant. By the term "internal particles" as used herein is meant particles which are precipitated in the polyester because at least part of the catalyst residue or anti-coloring agent, containing Ca, Si, Mn, Mg, Sb, Ge, P, Li, K or Na, is reacted with a monomer or oligomer in the polycondensation stage thereby forming insoluble particles. Such internal particles are described in U.S. Pat. Nos. 4,138,386 and 4,067,855.

The internal particles have an average particle diameter of 0.1 to 5$\mu$ in general. The term "external particles" herein means chemically inactive particles selected from the group consisting of oxides and inorganic salts of elements of Groups II, III and IV in the Periodic Table having an average particle diameter of 0.1 to 10μ. They are, for example, titanium oxide, fine silica particles and calcium carbonate. The PET may contain a stabilizer such as phosphoric acid, phosphorous acid or an ester thereof. PET has an intrinsic viscosity of preferably 0.4 to 1.0, particularly 0.55 to 0.8. The preferred range of the intrinsic viscosity is the same as that of the final film product.

The film of the present invention is characterized in that it has high tensile-strength in both longitudinal and transverse directions. Indispensable conditions of this film are as follows:

The PET film of the present invention has the sum of F-5 values in longitudinal and transverse directions of 3500 to 5000 kg/cm$^2$. If the sum is less than 3500 kg/cm$^2$, it is difficult to produce the magnetic recording medium recording for a long period of time and when such a film is used as a base film of a thin video magnetic recording medium having a thickness of up to 9μ, it exhibits an insufficient toughness and dimensional stability against an external force. Thus, it cannot be used as a magnetic recording medium of which a high precision is required. It is thus desirable that the sum of F-5 values in longitudinal and transverse directions is above 3500 kg/cm$^2$, and at the same time the F-5 value in longitudinal direction is at least 1800 kg/cm$^2$ and that in transverse direction is at least 1700 kg/cm$^2$.

The sum of F-5 values exceeding 5000 kg/cm$^2$ brings about the lowering of productivity such as deterioration of the flatness.

In case the film is used as a magnetic recording medium for a smaller device, such as a video cassette type, a preferable F-5 value in the longitudinal direction is 2000 kg/cm$^2$ or higher.

The film of the present invention has absolute heat shrinkages in both longitudinal and transverse directions at 100° C. of up to 2.5%. If the film has a higher heat shrinkage, its dimensional stability is reduced by the influence of heat in the magnetic layer-forming step.

The film of the present invention has an amorphous orientation factor of −1.5 to 0.5. If this factor is below −1.5, the resulting film has an unbalanced tensile strength, i.e., a higher transverse tensile strength. On the contrary, if it exceeds 0.5, the resulting film has an unbalanced tensile strength, i.e., a higher longitudinal tenacity.

The polyethylene terephthalate constituting the film has an average crystal size of preferably up to 50 Å, particularly up to 45 Å. If the average crystal size is below 50 Å, the longitudinal and transverse tensile strength are well-balanced and heat shrinkage can be reduced easily. The lower the minimum average crystal size, the better. The possible minimum value is generally 30 Å, though it is not particularly limited.

Now, the description will be made on the process for producing the PET film of the present invention.

The above-mentioned PET is molten and extruded through a nozzle or a die slit in an ordinary manner to form a sheet, which is then cast on a cooling drum and solidified. The melting temperature is generally 260° to 300° C. and the cooling drum is preferably cooled at 5 to 75° C. In the course of the extrusion and casting, it is effective for example to apply an electrostatic charge so as to prevent the involution of air between the cooling drum and the cast sheet or the deposition of monomers and oligomers on the cooling drum. The obtained cast sheet is then stretched longitudinally in multiple stages.

It is necessary in the present invention that the longitudinally stretched film has specified characteristics. Therefore, the multi-stage longitudinal stretching is carried out under specific conditions. Namely, the longitudinally stretched film should have an amorphous orientation factor of 0.6 to 1.0 exclusive and birefringence of 0.02 to 0.1, preferably 0.03 to 0.08. The multi-stage longitudinal stretching is performed by a method based on the difference in circumferential velocity of rollers.

Recommended conditions in the multi-stage stretching step in the present invention will be shown as follows. In the first stage, the stretching temperature is 110° to 150° C., preferably 115° to 135° C. and stretching ratio is 1.3 to 3.0, preferably 1.5 to 2.5. In and after the second stage, the stretching temperature is 85° to 120° C., preferably 95° to 115° C. and is lower than that of the first stage and stretching ratio is 2.0 to 4.0, preferably 2.0 to 3.0.

If the temperature in the first stage and/or that in the second stage are (is) below the above-mentioned ranges, the birefringence would exceed 0.1 unfavorably. On the other hand, if the temperature in the first stage and/or that in the second stage are (is) above the above-mentioned range, the amorphous orientation factor would be below 0.6.

If the amorphous orientation factor and birefringence are beyond the above-mentioned ranges, the film would be broken in the subsequent transverse stretching step and re-stretching step, whereby the operation is interrupted each time. As a result, the stable production of the film becomes impossible. Further, the resulting film may have insufficient or nonuniform physical properties and quality.

A reason why the first multi-stage longitudinal stretching is effective for obtaining the film of the present invention having specific properties has not fully been elucidated yet. It is supposed, however, that an amorphous part can be highly oriented, though the crystallization does not proceed, by the multi-stage longitudinal stretching under the specific conditions. It is considered that this fact greatly contributes to the production of a tensile-strength film having a low coefficient of shrinkage without the breakage.

The transverse stretching after the multi-stage longitudinal stretching step is carried out generally by means of a tenter wherein both ends of the film is clipped. The transverse stretching ratio is at least 2.5, preferably 2.6 to 4.5. The stretching temperature is in the range from the point 5° C. higher than a second-order transition temperature of the film to 150° C., preferably, from a point 10° C. higher than the second-order transition temperature of the film to 130° C.

The biaxial stretching after the transverse stretching may be carried out by either longitudinal→transverse sucessive biaxial stretching (hereinafter referred to as "successive biaxial restretching") or simultaneous longitudinal/transverse biaxial stretching (hereinafter referred to as "simultaneous biaxial stretching"). Of these two types of biaxial restretching, the latter is preferable because of ease in attaining well-balanced longitudinal and transverse strengths.

Preferable modes of embodiment of these biaxial restretchings will now be described.

(1)
Successive biaxial restretching method: In this method, a film is longitudinally stretched by an ordinary roll method and then transversely stretched by an ordinary tenter method. The film to be stretched may be in any desired form such as a film with edges, edgeless film or film with turned up edges.

The stretching ratio in each of the longitudinal and transverse directions is 1.5 to 2.5, preferably 1.5 to 2.3 and the stretching temperature is in the range from a point 10° C. higher than the second-order transition temperature to a point 40° C. lower than the melting point, preferably in the range from a point 15° C. higher than the second-order transition temperature to 170° C. These conditions are suitable for obtaining a film having good stretchability and well-balanced tensile strength in both directions.

(2)
Simultaneous biaxial stretching method: As this method, any process capable of stretching a film in both longitudinal and transverse directions simultaneously may be employed. For example, both edges of a film are clipped and distances between the clips along longitudinal directions and between the clips in transverse direction are extended simultaneously to effect the stretching in both longitudinal and transverse directions simultaneously. The film to be clipped may have any desired form such as a film with edges, edgeless film or film with turned up edges. The simultaneous biaxial stretching is effected at a stretching ratio of 1.5 to 2.5, particularly 1.5 to 2.3, in each of longitudinal and transverse directions at a stretching temperature in the range from a point 10° C. higher than the second-order transition temperature to a point 40° C. lower than the melting point, particularly preferably from a point 15° C. higher than the second-order transition temperature to 170° C.

Reasons why the above-mentioned conditions are preferred in the simultaneous biaxial stretching method are that within this temperature range, a film having a high tensile-strength can be obtained easily, frequent breakage of the film can be prevented, and loss of transverse tensile strength and unevenness of the quality due to transverse neckdown between the clips can be prevented. The stretching ratios in the longitudinal and transverse directions may be either equal or unequal.

The product of the stretching ratio (total-area stretching ratio) in all the above-mentioned steps including the multi-stage longitudinal stretching, transverse stretching and biaxial restretching steps should be at least 27, preferably at least 28 and particularly at least 30. If this value is less than 27, the intended high-tensile-strength film having well-balanced longitudinal and transverse strengths cannot be obtained.

The film thus restretched under the above-mentioned conditions is then subjected to heat setting to further increase its dimensional stability.

The heat setting is preferably carried out at a temperature in the range from a point 50° C. higher than the second-order transition temperature to a point 10° C. lower than the melting point, particularly preferably at least a point 10° C. higher than the biaxial restretching temperature and in the range from a point 80° C. higher than the second-order transition temperature to a point 20° C. lower than the melting point under tension or particularly preferably under relaxation. This treatment may be effected by rolls or a tenter.

By this heat setting, a film having absolute heat shrinkage of up to 2.5% in each of the longitudinal and transverse directions at 100° C. can be obtained in the present invention.

The film thus heat-set may be subjected to a known corona discharge treatment in an atmosphere of nitrogen, air, carbon dioxide or a mixture of two or more of them. Further, a coating or a laminate may be formed on the film so as to impart adhesiveness, wet resistance, heat sealability, lubricity and surface smoothness thereto. This thickness of the PET film of the present invention is not particularly limited but a thickness in the range of 1 to 75$\mu$ is preferred or a magnetic recording tape or magnetic recording disc.

The PET film thus formed is substantially free of longitudinal wrinkles, etc. in a step of winding to form a roll and the roll has a good appearance. In addition, the film has both well-balanced and longitudinal and transverse tensile strength and a dimensional stability far superior to those of the conventional products.

As described above in detail, according to the present invention, an effect is achieved that a PET film having high longitudinal and transverse tensile strength and dimensional stability can be obtained stably by employing a combination of (1) specific biaxial stretching comprising specific multi-stage longitudinal stretching and transverse stretching with (2) biaxial re-stretching.

The film thus obtained according to the present invention is suitable for use as a quite thin film such as a base of magnetic recording medium, dielectric of condenser and graphic and/or printing material. The film is suitable particularly for use as a base film of magnetic recording medium.

Then, a magnetic layer is formed on at least one surface of the above-mentioned film according to the present invention to form a magnetic recording medium.

The magnetic layer of the present invention may be (1) a known magnetic layer formed by the so-called coating application method wherein a dispersion of a powdery magnetic material such as Co-doped $\gamma$-Fe$_2$O$_3$, $\gamma$-Fe$_2$O$_3$, CrO$_2$ or a ferromagnetic alloy in an organic binder is used or (2) any ferromagnetic layer formed by vaccum deposition, sputtering, ion-plating or electroplating method wherein a ferromagnetic metal such as Fe, Co or Ni or a magnetic alloy containing the same is used. The latter ferromagnetic layer is preferred. The thickness of the magnetic layer which varies depending on the magnetic layer-forming method is generally preferably in the range of 0.05 to 5$\mu$.

In case the recording is to be effected over a long period of time and particularly when a ferromagnetic layer is used, it is preferred to control the total thickness of the magnetic recording medium including the magnetic layer within the range of 4 to 9$\mu$.

In the binder-type magnetic tape prepared by applying a magnetic coating mainly comprising a magnetic powder and a binder to a base film, it is necessary that the base film should have a high dimensional stability at a high temperature, since the temperature is elevated in a step of drying of the binder or the roll-press and also due to the elevation of the processing temperature caused by an increase of the processing velocity.

For a so-called metallized magnetic recording medium prepared by the direct vacuum metallizing of a ferromagnetic substance, a base film should have a high dimensional stability at a high temperature because the temperature of the base is kept at 80° C. or higher in the metallizing preparation step thereof.

If the base film has high heat shrinkage, the strain in the above-mentioned treatment is increased and developed during the actual use thereof as a magnetic recording medium under severe conditions.

A film used as a magnetic recording medium, particularly video cassette tape, should have a high mechanical strength and also maintain stable running properties for a long time, since it is subjected to repeated running and loading under severe conditions. If these conditions are not satisfied, an image disorder is caused at the time of starting or stopping or during running.

As a video camera has become smaller recently, reduction of the size and elongation of the recording time are required also of a cassette tape used. Further, a reduction in thickness of both the magnetic layer and the base film is demanded. However, a thin base film has high heat shrinkage and low dimensional stability unfavorably.

The magnetic recording medium containing the film of the present invention is free of these defects.

Characteristic properties such as F-5 value, heat shrinkage, amorphous orientation factor and average crystal size of the film layer of the resulting magnetic recording medium are substantially equal to those of the film before the formation of the magnetic layer.

The magnetic recording medium of the present invention may be used as a magnetic tape, magnetic card or magnetic disc in a computer, an audio or video set or a measuring device. It is particularly suitably used in a video set.

The amorphous orientation factor, F-5 value, heat shrinkage, average crystal size, birefringence, melting point and second-order transition temperature in the present invention were determined by the following methods:

(1) Amorphous orientation factor:

A polyester film was immersed in a water bath containing optical whitening agent "Mikephor ETN" (a product of Mitsui Toatsu Chemicals Inc.) at 55° C. and then dried with air. A parallel component of polarized fluorescence intensity in the film plane was measured by means of a polarizing fluorometer "FOM-1" (a product of Japan Spectroscopic Co., Ltd.). The amorphous orientation factor (F) was determined according to the formula:

$$F = 1 - (B/A)$$

wherein:
F represents amorphous orientation factor,
A represents a parallel component of polarized fluorescence intensity in longitudinal direction, and
B represents a parallel component of polarized fluorescence intensity in a transverse direction.

(2) F-5 value:

A film cut into a width of 10 mm (when it had a magnetic layer formed on the film, the layer was removed before the test) was set in such a manner that a distance between chucks was 100 mm. A tensile strength of the film at 5% stretching was measured at an extension rate of 20 mm/min at 25° C.

(3) Heat shrinkage:

The length of a sample was measured. Then, the sample was left to stand in an air-conditioned oven kept at 100° C. under no tension for 30 min. After this heat treatment followed by cooling, the length of the sample was measured again. The heat shrinkage was calculated from the lengths before and after the heat treatment.

(4) Average crystal particle size:

A half-height width of a [100] crystal plane was determined with an X-ray diffraction device (a product of Rigaku Denki Co., Ltd.). The average crystal size was calculated according to the following formula:

$$A = (0.9\lambda)/(B \cos \theta)$$

wherein:
$\lambda$ is 2.2896 (Å) and
B represents a half-height width (radian).

As a base line, a straight line connecting points having scattering intensities of $2\theta = 50°$ and $2\theta = 20°$ was employed.

(5) Birefringence:

Birefringence was measured at a temperature of 25° C. and a relative humidity of 65% after taking a sample by means of a Berek compensator.

(6) Melting point and second-order transition temperature:

Melting point and second-order transition temperature were measured according to ASTM D 3418-75.

The following examples will further illustrate the embodiments of the present invention.

EXAMPLES 1-5

Polyethylene terephthalate of IV 0.65 was melt-extruded at 290° C. and then cooled rapidly to obtain a substantially amorphous sheet. The sheet was stretched longitudinally taking advantage of a circumferential speed difference of multi-stage nip rollers at 125° C. at a stretching ratio of 2.05 in the first stage and continuously stretched longitudinally at 113° C. at a stretching ratio of 2.32 in the second stage. The resulting multi-stage longitudinally stretched film had an amorphous orientation factor of 0.81, birefringence of 0.038 and density of 1.3422.

Then, the film was stretched transversely in a tenter at 105° C. at a stretching ratio of 2.8. The film was further stretched at a stretching ratio as shown in Table 1-1 in a simultaneous biaxial stretching tenter at 150° C. at a rate of 3000%/min and then heat-set at 200° C. under tension. The final thickness of the film was 7 to 9μ. Characteristic properties of the resulting films were examined to obtain the results shown in Table 1-2.

As shown in Examples 1-3 in Table 1-2, if simultaneous stretching ratio is increased while longitudinal and transverse stretching ratios are kept constant, F-5 values in both longitudinal and transverse directions are improved and a super tensilized film having the sum of F-5 values in longitudinal and transverse directions of 3500 kg/cm$^2$ can be obtained. Heat shrinkage after heating at 100° C. for 30 min was not higher than 2.5%. The total area stretching ratio was at least 30 in all cases. The stretching at such a high stretching ratio can thus be attained without breakage. The stretchability was excellent.

In Example 4, the transverse stretching ratio was higher than the longitudinal stretching ratio in the simultaneous biaxial stretching step to effect slightly unbalanced stretching. And also in Example 5, the longitudinal stretching ratio was slightly higher than the transverse stretching ratio in the simultaneous biaxial stretching step.

EXAMPLES 6-11

Films were stretched in the same manner as in Examples 1-5 except that the longitudinal stretching conditions in the first and second stages were altered as shown in Table 1-1 to obtain longitudinally stretched films having various amorphous orientation factors and birefringences. Then, the films were stretched transversely under conditions shown in Table 1-1 and then subjected to the simultaneous biaxial stretching under conditions shown in Table 1-1 to obtain final films. All the films had a high stretchability and a total area stretching ratio of at least 30.

As for characteristic properties of the resulting films, F-5 values in longitudinal and transverse directions and simultaneous biaxial stretching ratios were increased as shown in Table 1-2. The sum of F-5 values in longitudinal and transverse directions of at least 3500 kg/cm$^2$ were obtained. Heat shrinkages after heating at 100° C. for 30 min was up to 2.5%.

COMPARATIVE EXAMPLES 1-3

In these comparative examples, the longitudinal stretching, transverse stretching and longitudinal restretching were carried out. The first longitudinal stretching was carried out in one stage. Stretching conditions were as shown in Table 1-1. In Comparative Example 1, the longitudinal stretching was effected at a low temperature at a high stretching ratio at once. The film thus stretched longitudinally had birefringence of above 0.1 and poor stretchability. The film was broken frequently at a stretching ratio of above 1.5. Accordingly, satisfactory high-tensile-strength film could not be obtained. In Comparative Example 2, the stretching ratio in the first longitudinal stretching step was kept low and that in the simultaneous biaxial stretching step was increased. The resulting film had a low amorphous orientation factor and a low mechanical strength. In Comparative Example 3, the stretching in the first step was carried out at a high temperature and a high stretching ratio. The resulting film had a low amorphous orientation factor, a low birefringence and a low mechanical strength. In all cases, the films were broken frequently and the stable production of high-strength films was impossible.

COMPARATIVE EXAMPLES 4-6

In these comparative examples, the multi-stage longitudinal stretching, transverse stretching and simultaneous biaxial stretching were carried out under stretching conditions as shown in Table 1-1. The stretching conditions were unsuitable and, therefore, physical properties of the films stretched longitudinally in multiple stages did not satisfy the requirements according to the present invention. The films showed poor stretchability in the subsequent stretching steps. F-5 values and heat shrinkages of the resulting films were also unsatisfactory.

TABLE 1

| | Multiple Longitudinal Stretching Conditions | | | | Characteristics of films after multiple-stage longitudinal stretching | | Transverse Stretching Conditions | | Simultaneous Biaxial Stretching Conditions | | | Total Stretching Ratio (Time) | | |
|---|---|---|---|---|---|---|---|---|---|---|---|---|---|---|
| | 1st Stage | | 2nd Stage | | Amorphous | Bire- | | | | Longi-tudinal | Trans-verse | | | |
| | Temp. (°C.) | Ratio (Time) | Temp. (°C.) | Ratio (Time) | Orientation Factor | frin-gence | Temp. (°C.) | Ratio (Time) | Temp. (°C.) | Ratio (Time) | Ratio (Time) | Longi-tudinal | Trans-verse | Area |
| Example Nos. | | | | | | | | | | | | | | |
| 1 | 125 | 2.05 | 113 | 2.32 | 0.81 | 0.038 | 105 | 2.8 | 150 | 1.7 | 1.7 | 8.08 | 4.76 | 38.5 |
| 2 | 125 | 2.05 | 113 | 2.32 | 0.81 | 0.038 | 105 | 2.8 | 150 | 1.85 | 1.85 | 8.30 | 5.04 | 45.6 |
| 3 | 125 | 2.05 | 113 | 2.32 | 0.81 | 0.038 | 105 | 2.8 | 150 | 2.05 | 2.05 | 9.75 | 5.74 | 56.0 |
| 4 | 125 | 2.05 | 113 | 2.32 | 0.81 | 0.038 | 105 | 2.8 | 150 | 1.5 | 2.2 | 7.13 | 6.16 | 43.9 |
| 5 | 125 | 2.05 | 113 | 2.32 | 0.81 | 0.038 | 105 | 2.8 | 150 | 2.1 | 1.8 | 9.98 | 5.04 | 50.3 |
| 6 | 130 | 1.8 | 115 | 2.37 | 0.69 | 0.029 | 105 | 3.0 | 150 | 1.7 | 1.7 | 7.52 | 5.10 | 37.0 |
| 7 | 130 | 1.8 | 115 | 2.37 | 0.69 | 0.029 | 105 | 3.0 | 150 | 1.8 | 1.8 | 7.68 | 5.40 | 41.5 |
| 8 | 120 | 2.05 | 110 | 2.54 | 0.92 | 0.068 | 105 | 3.2 | 160 | 1.5 | 1.5 | 7.81 | 4.80 | 37.5 |
| 9 | 120 | 2.05 | 110 | 2.54 | 0.92 | 0.068 | 105 | 3.2 | 160 | 1.6 | 1.6 | 8.33 | 5.12 | 42.7 |
| 10 | 130 | 1.88 | 113 | 2.4 | 0.76 | 0.031 | 95 | 3.0 | 160 | 1.8 | 1.8 | 8.12 | 5.40 | 43.9 |
| 11 | 130 | 1.88 | 113 | 2.4 | 0.76 | 0.031 | 95 | 3.0 | 160 | 2.0 | 2.0 | 9.02 | 6.00 | 54.1 |
| Comparative Example Nos. | | | | | | | | | | | | | | |
| 1 | 93 | 4.0 | — | — | 0.91 | 0.16 | 105 | 3.0 | 150 | 1.4 | 1.4 | 5.60 | 4.20 | 23.5 |
| 2 | 105 | 3.0 | — | — | 0.42 | 0.061 | 105 | 3.0 | 150 | 1.8 | 1.8 | 5.40 | 5.40 | 29.2 |
| 3 | 130 | 4.0 | — | — | 0.26 | 0.013 | 105 | 3.0 | 150 | 1.4 | 1.4 | 5.60 | 4.20 | 29.2 |
| 4 | 100 | 1.8 | 100 | 2.3 | 0.84 | 0.124 | 105 | 3.0 | 150 | 1.4 | 1.4 | 5.80 | 4.20 | 24.3 |
| 5 | 100 | 1.8 | 130 | 2.3 | 0.46 | 0.071 | 105 | 3.0 | 150 | 1.5 | 1.5 | 6.21 | 4.50 | 27.9 |
| 6 | 130 | 1.7 | 113 | 1.5 | 0.52 | 0.018 | 105 | 3.0 | 150 | 1.8* | 1.8 | 4.59 | 5.40 | 24.8 |

| | F - 5 value (kg/cm$^2$) | | Heat shrinkage (%) | | Number of times of breakage | |
|---|---|---|---|---|---|---|
| | Longitudinal | Transverse | Longitudinal | Transverse | (per 9,000 m) | Remarks |
| Example | Nos. | | | | | |
| 1 | 2200 | 1720 | 1.33 | 0.56 | 0 | — |
| 2 | 2400 | 1700 | 1.62 | 0.63 | 0 | — |
| 3 | 2540 | 1750 | 1.79 | 0.74 | 1 | — |
| 4 | 1550 | 3180 | −0.02 | 1.96 | 0 | — |
| 5 | 3240 | 1520 | 2.03 | 0.30 | 0 | — |
| 6 | 1860 | 1760 | 1.19 | 1.24 | 0 | — |
| 7 | 2190 | 2000 | 1.53 | 1.43 | 0 | — |
| 8 | 2270 | 1750 | 1.71 | 0.41 | 0 | — |
| 9 | 2520 | 1820 | 1.96 | 0.61 | 0 | — |

TABLE 1-continued

| | | | | | | |
|---|---|---|---|---|---|---|
| 10 | 1690 | 2160 | 1.73 | 1.94 | 0 | — |
| 11 | 1780 | 2180 | 1.21 | 2.33 | 1 | — |
| Comparative Example Nos. | | | | | | |
| 1 | 1250 | 1160 | 1.53 | 1.24 | 0 | Frequent breakage at a simultaneous biaxial stretching ratio of about 1.5. |
| 2 | 1180 | 1320 | 1.33 | 1.43 | 8 | Frequent breakage at a simultaneous biaxial stretching ratio of about 1.8. |
| 3 | 1430 | 1010 | 1.82 | 0.94 | 4 | Frequent breakage at a simultaneous biaxial stretching ratio of about 1.5. |
| 4 | 1380 | 1090 | 1.44 | 0.86 | 0 | Frequent breakage at a simultaneous biaxial stretching ratio of about 1.5. |
| 5 | 1740 | 1430 | 2.92 | 1.26 | 6 | Frequent breakage at a simultaneous biaxial stretching ratio of about 1.6. |
| 6 | 1220 | 1340 | 1.14 | 1.60 | 3 | Frequent breakage at a simultaneous biaxial stretching ratio of about 1.8. |

EXAMPLES 12–17

Molten linear polyethylene terephthalate was extruded through a die slit on a drum cooled to a temperature below 80° C. to cool and solidify the same. The obtained, substantially non-oriented film was stretched under conditions shown in Table 2-1 and then heat-set at 200° C. under tension for 6 sec. The final film thickness was adjusted to $8\mu$ in all cases by controlling the amount of extrusion of the molten polymer depending on the conditions.

Characteristic properties of the films obtained by the above-mentioned processes were as shown in Table 2-2.

A composition comprising the following components:
  Ferromagnetic alloy powder (Fe-Co-B) (average particle size: 400 Å): 300 parts
  Zinc powder (average particle size: $2\mu$): 25 parts
  Cellulose acetate butyrate: 30 parts
  Epoxy resin: 25 parts
  Silicone oil (lubricant): 4 parts
  Lecithin (dispersant): 5 parts
  Toluene (solvent): 200 parts
  Methyl ethyl ketone (solvent): 200 parts
  Ethyl acetate (solvent): 100 parts
was charged in a ball mill and kneaded sufficiently. Then, 180 parts of a polyisocyanate compound (Desmodur L-75) was added to the mixture and the whole was stirred for 30 min. Then, the mixture was applied to one surface of the polyethylene terephthalate film obtained as above in such a manner that a coating thickness after drying of $3\mu$ would be obtained under the application of magnetic field. The film was dried and then subjected to the curing treatment and mirror finish. The film was slit in a width of ½ inch to obtain a video tape.

Characteristic properties of the obtained video tapes are shown in Table 2-2.

In the column of load for 5% elongation in Table 2-2, symbols , and Δ represent that the results were quite good, good and not so good, respectively. It will be understood that films having a high F-5 value are suitable for use as magnetic tapes.

A term "heat touch" indicates a state of contact of a magnetic tape with magnetic head in a helical scan-type VTR. It has been known that the head touch is reduced as the film thickness becomes bad.

In this Table, "A" represents that the head touch was good because the output signal voltage waveform by the touch in the tape playing was strong and flat when viewed as a whole picture. "B" represents that the touch was not so good because the signal was distorted upwards or downwards in its middle portion. "C" represents that the touch was bad because the signal per se was weak and deformed. As seen from the Table, a thin base film of a thickness of $8\mu$ used in the Examples of the present invention has a high F-5 value favorably. A low film strength resulted in unstable running properties and disorder of the picture quality or even tape-stopping-behavior.

Further, when the films are heated in the step of drying the coating layer and curing step (vacuum metallizing step in case of a metallized magnetic tape), heat shrinkage of the film occurs to cause disorder of the picture quality. The stress is changed remarkably particularly at the time of starting or stopping of the magnetic tape to invite the disorder of the picture quality. The picture quality is shown by disorder of the video picture quality of a running tape in three grades ( , and Δ) and starting and stopping properties are shown by disorder of the picture quality at the times of starting and stopping in three grades ( , and Δ). The magnetic tape of the present invention is suitable for use as a thin magnetic recording medium, since it has an excellent head touch, mechanical strength and dimensional stability which withstand rough use, stable running properties and good electromagnetic transducing properties (Read/Write characteristics of magnetic recording).

COMPARATIVE EXAMPLES 7–11

For comparison, video tapes were produced under the same conditions as in Example 1 except that stretching conditions were the same as in Comparative Examples shown in Table 1-1. Properties of the films for use as video tapes and properties of the video tapes were as shown in Table 2-2.

The film obtained in Comparative Example 7 corresponds to a commercially available balance-type film. It had an insufficient tensile strength and was unsuitable for use as the thin magnetic tape. In Comparative Example 8, F-5 values of the film in longitudinal and transverse directions were well-balanced so as to increase the F-5 value as far as possible according to a known process. Head touch of this film was better than that of the film of Comparative Example 7 but it was still insufficient. In Comparative Examples 9 and 10, the films obtained were tensilized films having an increased longitudinal restretching ratio. They had a significantly deteriorated transverse F-5 value unfavorably. The film obtained in Comparative Example 11 had an increased transverse F-5 value. However, the film had an inferior longitudinal F-5 value and it was unsatisfactory with respect to a load for 5% longitudinal elongation required of magnetic tapes.

TABLE 2

| | Multiple Longitudinal Stretching Conditions | | | | Characteristics of films after multiple-stage longitudinal stretching | | Transverse Stretching Conditions | | Simultaneous Biaxial Stretching Conditions | | | Total Stretching Ratio (Time) | | |
|---|---|---|---|---|---|---|---|---|---|---|---|---|---|---|
| | 1st Stage | | 2nd Stage | | Amorphous | Bire- | | | | Longi-tudinal | Trans-verse | | | |
| | Temp. (°C.) | Ratio (Time) | Temp. (°C.) | Ratio (Time) | Orientation Factor | frin-gence | Temp. (°C.) | Ratio (Time) | Temp. (°C.) | Ratio (Time) | Ratio (Time) | Longi-tudinal | Trans-verse | Total |
| Example Nos. | | | | | | | | | | | | | | |
| 12 | 125 | 2.05 | 113 | 2.32 | 0.81 | 0.038 | 105 | 2.8 | 150 | 1.85 | 1.85 | 8.80 | 5.04 | 45.6 |
| 13 | 130 | 1.8 | 115 | 2.37 | 0.69 | 0.029 | 105 | 3.0 | 150 | 1.8 | 1.8 | 7.68 | 5.40 | 41.5 |
| 14 | 130 | 1.88 | 113 | 2.4 | 0.76 | 0.031 | 95 | 3.0 | 160 | 2.0 | 2.0 | 9.02 | 6.00 | 54.1 |
| 15 | 125 | 2.05 | 113 | 2.37 | 0.81 | 0.038 | 105 | 2.8 | 150 | 2.05 | 2.05 | 9.96 | 5.74 | 57.2 |
| 16 | 130 | 1.88 | 113 | 2.40 | 0.76 | 0.031 | 95 | 3.0 | 160 | 1.85 | 1.85 | 8.35 | 5.55 | 46.3 |
| 17 | 125 | 2.05 | 113 | 2.32 | 0.81 | 0.038 | 105 | 2.8 | 150 | 1.5 | 2.2 | 7.13 | 6.16 | 43.9 |
| Comparative Example Nos. | | | | | | | | | | | | | | |
| 7 | 93 | 4.0 | — | — | 0.91 | 0.16 | 105 | 3.0 | 150 | 1.4 | 1.4 | 5.60 | 4.20 | 23.5 |
| 8 | 130 | 1.7 | 113 | 1.5 | 0.30 | 0.018 | 105 | 3.0 | 150 | 1.8 | 1.8 | 4.59 | 5.40 | 24.8 |
| 9 | 130 | 4.0 | — | — | 0.26 | 0.013 | 105 | 3.0 | 150 | 1.4 | 1.4 | 5.60 | 4.20 | 29.2 |
| 10 | 100 | 1.8 | 100 | 2.3 | 0.65 | 0.080 | 110 | 3.5 | 150 | 1.4 | — | 5.80 | 3.50 | 20.3 |
| 11 | 100 | 1.8 | 100 | 2.3 | 0.65 | 0.080 | 110 | 3.5 | 150 | — | 1.4 | 4.14 | 4.90 | 20.3 |

| | F - 5 value (kg/cm²) | | Heat Shrinkage (%) | | Amorphous orientation factor (−) | Average crystal particle size (Å) | Load for 5% elongation of magnetic tape | Head touch | Picture quality | Starting and stopping properties |
|---|---|---|---|---|---|---|---|---|---|---|
| | Longi-tudinal | Trans-verse | Longi-tudinal | Trans-verse | | | | | | |
| Example Nos. | | | | | | | | | | |
| 12 | 2400 | 1820 | 1.60 | 0.63 | 0.31 | 39.6 | | A | | |
| 13 | 2200 | 2010 | 1.09 | 0.89 | 0.12 | 38.4 | | A | | |
| 14 | 1850 | 2180 | 0.94 | 1.03 | −0.21 | 38.8 | | A | | |
| 15 | 2860 | 1630 | 2.05 | 0.36 | 0.43 | 43.2 | | A | | |
| 16 | 1750 | 2430 | 0.62 | 1.62 | −0.63 | 38.3 | | A | | |
| 17 | 1600 | 2800 | 0.43 | 1.91 | −1.22 | 32.6 | | A | | |
| Comparative Example Nos. | | | | | | | | | | |
| 7 | 1210 | 1150 | 3.4 | 0.44 | 0.22 | 53.7 | Δ | C | Δ | Δ |
| 8 | 1460 | 1410 | 2.1 | 0.88 | 0.21 | 51.2 | Δ | B | | Δ |
| 9 | 1820 | 1020 | 2.8 | 0.91 | 0.43 | 52.1 | Δ | C | | |
| 10 | 1850 | 980 | 4.4 | 0.76 | 0.51 | 55.7 | Δ | C | Δ | |
| 11 | 1020 | 1760 | 3.2 | 2.9 | 0.21 | 53.6 | Δ | A | Δ | Δ |

What is claimed is:

1. A polyethylene terephthalate film having the sum of F-5 valves in longitudinal and transverse directions of 3500 to 5000 kg/cm², absolute coefficients of heat shrinkage in longitudinal and transverse directions at 100° C. of up to 2.5% and an amorphous orientation factor of −1.5 to 0.5,
    said film being obtained by subjecting a polyethylene terephthalate sheet to multi-stage longitudinal stretching, transverse stretching and biaxial re-stretching, wherein the total stretching ratio is at least 27.

2. A polyethylene terephthalate film according to claim 1 wherein the F-5 value in longitudinal direction is at least 1800 kg/cm² and the F-5 value in transverse direction is at least 1700 kg/cm².

3. A polyethylene terephthalate film according to claim 1 wherein the F-5 value in longitudinal direction is at least 2000 kg/cm².

4. A polyethylene terephthalate film according to claim 1 wherein the F-5 value in transverse direction is at least 2000 kg/cm².

5. A polyethylene terephthalate film according to claim 1 wherein the polyethylene terephthalate has an average crystal size of up to 50 Å.

6. A polyethylene terephthalate film according to claim 1 wherein the film has a thickness of 1 to 75µ.

7. A polyethylene terephthalate film according to claim 1 wherein the polyethylene terephthalate is an ethylene terephthalate homopolymer.

8. A base film for a magnetic recording medium comprising a polyethylene terephthalate film having the sum of F-5 values in longitudinal and transverse direction of 3500 to 5000 kg/cm², absolute heat shrinkage in longitudinal and transverse directions at 100° C. of up to 2.5% and an amorphous orientation factor of −1.5 to 0.5,
    said film being prepared by subjecting a polyethylene terephthalate sheet to multi-stage longitudinal stretching, transverse stretching and biaxial re-stretching, wherein the total stretching ratio is at least 27.

* * * * *